Figure 1:
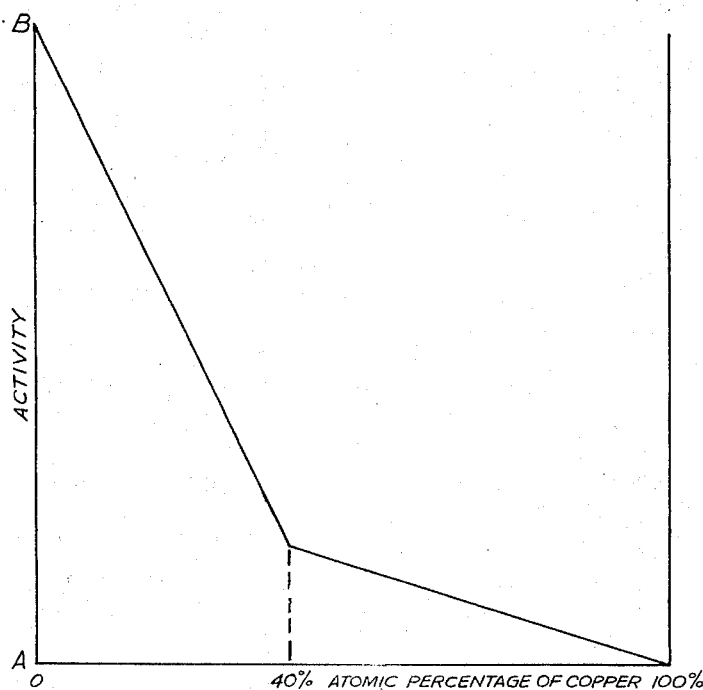

March 23, 1954     P. W. REYNOLDS ET AL     2,673,189
PREPARATION OF COPPER-NICKEL-ALUMINUM CATALYSTS
Filed Feb. 8, 1950     2 Sheets-Sheet 1

FIG. I

Inventors
PETER WILLIAM REYNOLDS
DENNIS ALBERT DOWDEN
JAMES ALAN MACKENZIE
BY Cushman, Darby & Cushman
Attorneys Patented Mar. 23, 1954

2,673,189

UNITED STATES PATENT OFFICE 2,673,189

PREPARATION OF COPPER-NICKEL-ALUMINUM CATALYSTS

Peter William Reynolds, Dennis Albert Dowden, and James Alan Mackenzie, Norton-on-Tees, England, assignors to Imperial Chemical Industries Limited, a corporation of Great Britain Application February 8, 1950, Serial No. 142,968

Claims priority, application Great Britain February 10, 1949

3 Claims. (Cl. 252—466)

This invention relates to the preparation of foraminate catalysts.

By the term "foraminate catalyst" as used in this specification is meant one comprising particles of pieces, for example granules prepared by crushing, of an alloy comprising the desired catalytically active metal or metals together with one or more other metals more soluble in acid or alkali or other extracting liquid than the desired catalytically active metal or metals, said alloy comprising at least one phase in which atoms of the desired catalytically active metal or metals and of the aforesaid more soluble metal or metals are on the same crystal and said particles or pieces having a robust core of alloy and an outer active layer having a skeletal structure resulting from the partial or complete removal by the extracting liquid of the more soluble metal or metals from the aforesaid phase or phases in said outer layer. The particles or pieces may be prepared in various ways, for example by crushing the cool alloy, and may be of various sizes, but are preferably ⅛" to ¼".

It is already known to prepare foraminate copper and foraminate nickel catalysts from copper-aluminium and nickel-aluminium alloys by the removal of a portion of the aluminium by treatment with aqueous caustic alkali. The copper or nickel catalyst prepared in this way have widely different activities when tested in the same reaction. Hitherto it has been difficult to prepare catalysts possessing any required intermediate activity, except by methods such as the partial poisoning of more active catalysts, for example with sulphur-containing substances. In some catalytic reactions, it is desirable to employ a catalyst having an activity intermediate between that of a highly active catalytic metal, for example nickel and a less active metal, for example copper.

According to the present invention there is provided a process for the preparation of copper-nickel-aluminium foraminate catalysts, in which pieces, for example granules of a copper-nickel-aluminium alloy, containing initially from 40 to 60% by weight of aluminium, are treated with an aqueous solution of caustic alkali to remove a portion at least of the aluminium from the surface layer of the alloy.

In operating according to the present invention, the copper:nickel ratio may be varied as desired. The optimum ratio for a particular reaction in which the catalyst is being used can be readily determined by a few simple preliminary trials of alloys of various copper:nickel ratios.

Alloys suitable for use in the present invention may be prepared for example by melting together in graphite crucibles, Mond nickel pellets, pure copper and pure aluminium. The homogeneous melts are preferably chill cast on to copper moulds and the cooled slabs crushed and screened.

Granules of the alloy, preferably having a size of ⅛" to ¼", are then activated by treatment with an aqueous solution of alkali.

Suitable aqueous solutions which can be used for the extraction of the aluminium from the alloy comprise the hydroxides of the alkali metals but in general caustic soda is preferred. Aqueous caustic soda solutions of 0.1% to 10% strength by weight are preferred for readily extractible alloys, while stronger solutions are preferably employed for alloys from which aluminium extraction is difficult. The extraction of the aluminium may be carried out at a temperature from room temperature which would be, under normal atmospheric conditions, about 16° C. up to 100° C. or above. For aluminium contents of the order of 40% by weight, aluminium extraction is difficult and is preferably accomplished by the use of strong alkali and an extraction temperature in the region of 100° C. As the aluminium content increases, the aluminium can be extracted more readily, and in preparing catalysts from alloys which are easily extracted, it is preferred to use a high space velocity, e. g. greater than 10, and preferably from 20 to 30 since this prevents the deposition of alumina, the latter frequently promoting undesirable side reactions. After the extraction of the required quantity of aluminium the stream of aqueous caustic soda is preferably replaced by a stream of liquid suitable for washing the catalyst, preferably without any interruption of flow. It is preferred to employ water as the liquid used for this washing process.

The activation treatment can be carried out in a separate vessel and the catalyst subsequently introduced into the reaction vessel, or the activation may be carried out in the reaction vessel provided that this is alkali resistant. Furthermore the catalysts of the present invention may be reactivated in the reaction vessel by further extraction of aluminium. It is preferred to remove from about 5 to 30% by weight of the aluminium at each activation and the total aluminium removed should not exceed 70% by weight of the initial aluminium content.

By the term "space velocity" as used in this specification is meant the volume of liquid passing per hour per unit volume of catalyst-filled space.

As will be seen from the example given below the activity of the catalysts prepared according to the present invention can be varied considerably by employing different copper:nickel ratios.

The activity of the catalyst decreases sharply from that of pure nickel as an increasing amount of copper is introduced, up to a copper content in the region of 40 atomic percentage, based upon the catalytically active metal content of the alloy. In the example given below, in which benzene is hydrogenated to cyclohexane at 100° C., it will be seen that when the atomic percentage of copper reaches 40, the activity of the catalyst is decreased to that of pure copper for this particular reaction, i. e., zero, and the preferred and most valuable catalysts are in fact those containing from 5 to 40 atomic percentage of copper. In general however, the catalyst having a copper content of 40 atomic percentage still has an activity greater than that of pure copper, and this activity decreases with increasing copper content until the activity becomes identical with that of pure copper. The general behaviour of the catalysts of the present invention is illustrated typically in Figure 1 of the drawing accompanying the complete specification in which the ordinate represents the activity and the abscissa represents the copper content of the catalyst and in which A represents the activity of pure copper and B the activity of pure nickel. The activity/copper content relationship of this type is exemplified by the hydrogenation of benzene to cyclohexane at 2.5° C. Although the activity/copper content relationship is in general of the type shown in Figure 1 the actual characteristics of the graph depend upon the reaction under consideration and the temperature at which this is being carried out, although the discontinuity or sharp inflexion in the curve in the region of 40 atomic percentage of copper is general. It should be noted that it is not suggested in this specification that copper-nickel-aluminium foraminate catalysts should be used for benzene hydrogenation. This reaction has only been selected because it is generally regarded as a standard one for assessing the activity of catalysts.

Catalysts of the present invention have a wide applicability. For example in the hydrogenation of olefins, for example ethylene, the use of catalysts containing nickel as the active constituent is undesirable since there is a considerable danger of temperature runaway and excessive deposition of carbon upon the catalyst. The use of copper, on the other hand, is undesirable since copper catalysts have a relatively low activity for this reaction. However a copper-nickel-aluminum foraminate catalyst prepared by the process of the present invention, can be selected to give very satisfactory results since such a catalyst has a considerably higher activity than foraminate copper catalysts, but does not lead to excessive carbon deposition or temperature runaways. Other suitable uses of catalysts prepared by the process of the present invention include hydrogenation of olefinic compounds present in admixture with aromatic compounds, the hydrogenation of acetylenes to olefines, and of di-olefines to mono-olefines.

It should be noted that by the term "atomic percentage of copper," as used in the present specification, is meant the number of atoms of copper contained in 100 atoms of active metal. Thus, in an alloy containing 30 atoms of copper to 70 atoms of nickel (per 100 atoms of total active metal), the atomic percentage of copper is 30.

The weight percentage of copper of the foregoing example can easily be calculated once the atomic percentage is known. This weight percentage is arrived at through the following calculations.

Consider a sample of alloy containing 100 "active" atoms, i. e., a total of 100 atoms of copper and nickel. Assume that $x$ of these atoms are copper, i. e., the "atomic percentage" of copper is $x$. Then the number of nickel atoms is $(100-x)$. From these figures, it is easy to obtain a general expression for the weight percentage of copper corresponding to an "atomic percentage" of copper of $x$. The total weight of the $x$ atoms of copper is $63.6x$. The total weight of the active atoms is:

$$63.6 + 58.7 \ (100-x)$$

since there are $x$ atoms of copper and $(100-x)$ atoms of nickel. (It will be understood that 63.6 and 58.7 are the atomic weights of copper and nickel respectively.) On simplifying this expression, it will be seen that the total weight of the 100 active atoms is $5870 + 4.9x$. Hence, the weight of copper, expressed as a percentage of the total weight of copper and nickel is given by the expression:

$$\frac{63.6x}{5870+4.9x} \times 100 = \text{weight percentage}$$

Thus, from the above it can be seen that in an alloy containing 30 atoms of copper to 70 atoms of nickel, the weight percentage of copper would be 31.7%.

The foregoing method of calculation was used in arriving at the "weight percentage of copper" figures set forth in the table, column 5 of this specification.

*Example*

A range of copper-nickel-aluminium foraminate catalysts was prepared by melting together in graphite crucibles, Mond nickel pellets, electrolytic copper of greater than 99.99% purity, and virgin aluminium of greater than 99.5% purity. The copper-nickel-aluminium foraminate catalysts indicated as B–I in the table in column 5 of the specification were made to contain 50% by weight of the aluminium. It should also be noted that the weight percentages of copper and nickel for the various catalysts tested based on a total weight of copper and nickel of 50% are set forth in the table in column 5, Example B–I. The homogeneous melts were chill cast on to copper moulds and the cooled slabs crushed and screened. Granules grading between ⅛" and ¼" were activated by extracting the granules with 2% aqueous sodium hydroxide solution passed over them at a space velocity of 25 at 100° C. until 20% by weight of the original aluminium had been removed. The progress of the extraction was followed by measuring the volume of hydrogen evolved. The activated granules were washed for 6 hours with cold distilled water at a space velocity of 25.

Catalysts A and J of the table (below), containing all nickel-aluminum and all copper-aluminum respectively, were prepared in the same manner for comparative purposes. It should be noted that the aluminum content varied in this instance from the 50% aluminum of catalysts B–I. In catalyst A, the aluminum content was 58% by weight with 42% by weight of nickel, and in catalyst J the aluminum content was 45% by weight with 55% by weight of copper. This difference in aluminum content between Examples A, B–I, and J is, of course, not significant since the effect of the omission of nickel or copper is what is being noted.

These catalysts were then tested in the hydrogenation of benzene to cyclohexane. An equimolecular mixture of sulphur-free benzene and sulphur-free cyclohexane was passed at a total liquid space velocity of 10 over 10 mls. of the foraminate catalyst maintained at 100° C. Hydrogen was also passed through the converter at a rate of 60 litres per hour. Activities were estimated in terms of the mean pass conversion to cyclohexane of the benzene calculated over 2 hour runs. The results given in the table below express the copper-nickel ratio in terms of both the atomic and weight percentage of copper, based upon the catalytically active (nickel-copper) metal content of the alloy.

*Table*

|  | A | B | C | D | E | F | G | H | I | J |
|---|---|---|---|---|---|---|---|---|---|---|
| Copper in active layer, atomic percentage | 0 | 9 | 23 | 26 | 30 | 34 | 38 | 58 | 79 | 100 |
| Weight percentage of copper | 0 | 9.7 | 24.5 | 27.6 | 31.7 | 35.8 | 39.9 | 60.0 | 80.4 | 100 |
| Pass conversion of benzene | 84 | 79 | 54 | 22 | 5 | 2 | 0 | 0 | 0 | 0 |

Figure 2:
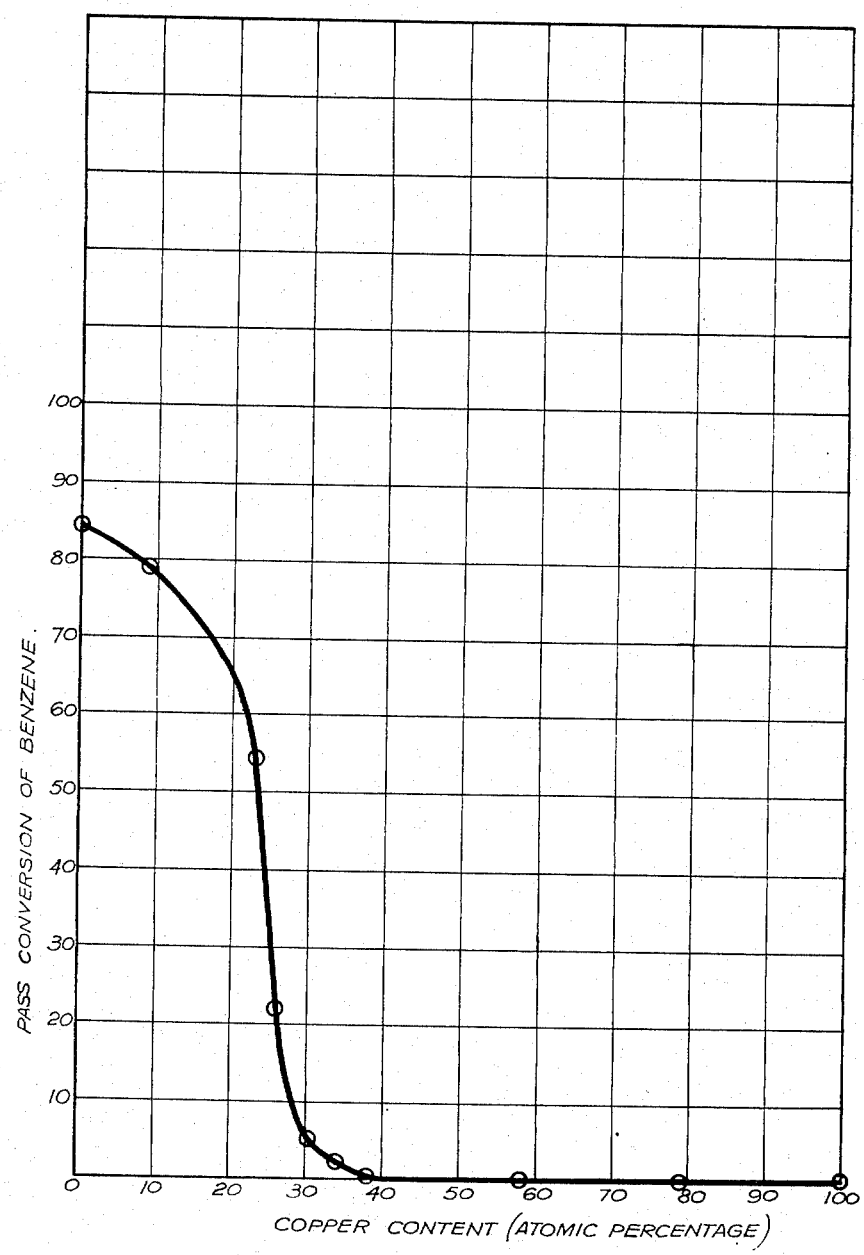

The relationship between these pass conversions and the copper content is depicted in Figure 2 accompanying the complete specification, in which the ordinate represents the pass conversion of benzene to cyclohexane and the abscissa represents the copper content of the catalyst.

Reference is also made to the table set forth heretofore. The relationship between pass conversion of benzene and copper content is again noted. For example, in Example B the weight percentages of copper, nickel and aluminum is 9.7%, 40.3%, and 50%, respectively, yielding a pass conversion of 79. Compare this with Example F wherein copper is 35.8% by weight, nickel is 14.2% by weight, and aluminum is again 50% by weight. Here the pass conversion of benzene is only 2.

When the reaction described above was repeated at a temperature of 225° C. the relationship between the activity of the catalyst and the copper nickel ratio differed to a slight extent from that observed when operating at 100° C. The activity decreased sharply as before as the atomic percentage of copper was increased from 0 to 40. With a further increase in the copper content, the activity slowly decreased, the conversion using pure copper foraminate catalyst being negligible.

We claim:

1. A process for the preparation of copper-nickel-aluminum foraminate catalysts which comprises treating granules of a copper-nickel-aluminum alloy containing initially from 40 to 60% by weight of aluminum and having an atomic percentage of copper greater than 5 and substantially less than 40 by passing an aqueous solution of caustic alkali over the granules of alloy at a space velocity greater than 10 and not more than about 30 at a temperature sufficient to remove a substantial portion of the aluminum from the surface layer of the granules, the total amount of aluminum removed being from about 5% to not more than 70% by weight of the initial aluminum content.

2. A process as set forth in claim 1 wherein the alloy contains about 50% by weight of aluminum and the treatment is carried out by treating with 0.1 to 10% by weight solution of sodium hydroxide, and the granules are subsequently washed by replacing the aqueous alkali with a stream of washing liquid comprising water, the velocity of said stream being such as to preclude the retention of alumina on the activated catalyst.

3. A process as set forth in claim 1 wherein the alloy contains about 50% by weight of aluminum and the treatment is carried out by treating with 0.1 to 10% by weight solution of sodium hydroxide passed over the granules of alloy at a space velocity of from 20 to 30 and at a temperature of from about 16° C. to 100° C., and the granules are subsequently washed by replacing the aqueous alkali with a stream of washing liquid comprising water, the velocity of said stream being such as to preclude the retention of alumina on the activated catalyst.

PETER WILLIAM REYNOLDS.
DENNIS ALBERT DOWDEN.
JAMES ALAN MACKENZIE.

References Cited in the file of this patent

UNITED STATES PATENTS

| Number | Name | Date |
|---|---|---|
| 1,915,473 | Raney | June 27, 1933 |
| 2,094,117 | Byrkit | Sept. 28, 1937 |

FOREIGN PATENTS

| Number | Country | Date |
|---|---|---|
| 633,531 | Great Britain | Dec. 19, 1949 |

OTHER REFERENCES

Raney, "Catalysts from Alloys," Ind. and Engr'g. Chem., Sept. 1940, pp. 1199–1203.

J. Soc. Chem. Ind. Japan, vol. 45, pp. 297–301, 1942.